US009556922B2

(12) United States Patent
Egolf et al.

(10) Patent No.: US 9,556,922 B2
(45) Date of Patent: Jan. 31, 2017

(54) END MEMBERS AND GAS SPRING ASSEMBLIES INCLUDING SAME

(71) Applicant: Firestone Industrial Products Company, LLC, Indianapolis (IN)

(72) Inventors: Stephen R. Egolf, Indianapolis, IN (US); Stephen C. Street, Carmel, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 14/424,207

(22) PCT Filed: Aug. 29, 2013

(86) PCT No.: PCT/US2013/057380
§ 371 (c)(1),
(2) Date: Feb. 26, 2015

(87) PCT Pub. No.: WO2014/036316
PCT Pub. Date: Mar. 6, 2014

(65) Prior Publication Data
US 2015/0211593 A1 Jul. 30, 2015

Related U.S. Application Data

(60) Provisional application No. 61/846,529, filed on Jul. 15, 2013, provisional application No. 61/694,517, filed on Aug. 29, 2012.

(51) Int. Cl.
*B60G 11/27* (2006.01)
*F16F 9/05* (2006.01)
(Continued)

(52) U.S. Cl.
CPC ............ *F16F 9/057* (2013.01); *B32B 7/08* (2013.01); *B60G 11/27* (2013.01); *B60G 11/62* (2013.01);
(Continued)

(58) Field of Classification Search
CPC ... B60G 11/27; B60G 11/62; B60G 2204/126; F16F 9/3207; F16F 13/002
(Continued)

(56) References Cited

U.S. PATENT DOCUMENTS 5,201,500 A * 4/1993 Ecktman ............... B60G 7/04
267/136
6,109,598 A * 8/2000 Hilburger ............. B60G 7/04
267/64.24
(Continued)

FOREIGN PATENT DOCUMENTS

EP 0295392 12/1988
EP 0501043 9/1992
(Continued)

OTHER PUBLICATIONS

International Search Report and Written Opinion for corresponding patent application No. PCT/US2013/057380 dated Nov. 27, 2013.

*Primary Examiner* — Faye M Fleming
(74) *Attorney, Agent, or Firm* — Thomas R. Kingsbury; Fay Sharpe LLP

(57) ABSTRACT

End members (204) for a gas spring assembly (200) include an end member body (226) that is formed from a polymeric material. The end member body (226) includes an end wall (234) and a bumper mount (258) that is integrally formed with at least the end wall (234) from the polymeric material of the end member body (226). The bumper mount (258) projects axially from the end wall (234) in a first direction. The end member (204) includes a central support post (256)
(Continued)

that extends from the end wall (234) in a direction opposite the bumper mount (258). The end member (204) also includes an insert (272) that is at least partially embedded within at least one of the bumper mount (258) and the central support post wall (256). Gas spring assemblies and suspension systems are also included.

20 Claims, 8 Drawing Sheets

(51) Int. Cl.
  *B60G 11/62* (2006.01)
  *B32B 7/08* (2006.01)
(52) U.S. Cl.
  CPC ............... *F16F 9/05* (2013.01); *F16F 9/052* (2013.01); *B32B 2605/00* (2013.01); *B60G 2202/152* (2013.01); *B60G 2204/126* (2013.01); *B60G 2204/4502* (2013.01); *B60G 2206/424* (2013.01); *Y10T 428/24008* (2015.01)

(58) Field of Classification Search
  USPC .............................. 280/124.157; 267/124, 35
  See application file for complete search history.

(56) References Cited

U.S. PATENT DOCUMENTS

| 7,500,659 | B2* | 3/2009 | Levy | ...................... | B60G 11/28 |
| | | | | | 267/64.21 |
| 7,896,320 | B2* | 3/2011 | Koeske | .................. | B60G 11/62 |
| | | | | | 267/122 |

FOREIGN PATENT DOCUMENTS

| EP | 0510359 | 10/1992 |
| EP | 1058026 | 12/2000 |
| EP | 2031267 | 3/2009 |
| JP | 2003343628 | 12/2003 |
| WO | WO 2008/097960 | 8/2008 |
| WO | WO 2011/021989 | 2/2011 |
| WO | WO 2011/093807 | 8/2011 |
| WO | WO 2012/097354 | 7/2012 |
| WO | WO 2013/113042 | 8/2013 |

* cited by examiner

END MEMBERS AND GAS SPRING ASSEMBLIES INCLUDING SAME

This application is the National Stage of International Application No. PCT/US2013/057380, filed on Aug. 29, 2013, which claims the benefit of priority from U.S. Provisional Patent Application No. 61/694,517 filed on Aug. 29, 2012 as well as U.S. Provisional Patent Application No. 61/846,529 filed on Jul. 15, 2013, the subject matter of both are hereby incorporated herein by reference in their entireties.

BACKGROUND

The subject matter of the present disclosure broadly relates to the art of gas spring devices and, more particularly, to end members configured to receivingly engage a jounce bumper as well as gas spring assemblies including such an end member and a jounce bumper. A suspension system can include one or more of such gas spring assemblies.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring assemblies of non-wheeled vehicles, support structures, height adjusting systems and actuators associated with industrial machinery, components thereof and/or other such equipment. Accordingly, the subject matter of the present disclosure is not intended to be limited to use in association with gas spring suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

Generally, the range of motion of a suspension system extends between a first or fully compressed condition and a second or fully extended condition. To eliminate contact between opposing portions of the sprung and unsprung masses, contact between opposing portions of components of the suspension system and/or contact between any combination thereof, jounce bumpers are commonly installed on one or more portions of the vehicle to prevent such opposing portions from directly impacting one another. Thus, during jounce motion of the suspension system, an opposing component will contact the jounce bumper rather than impacting the component on or near which the jounce bumper is mounted.

Jounce bumpers of a variety of types, kinds and configurations have been developed and are commonly used. Additionally, a variety of arrangements and constructions have been developed for end members as well as for connection arrangements for securing jounce bumpers and end members together. Notwithstanding the wide usage and overall success of such known designs, it is believed to be generally desirable to develop new constructions and/or designs that may advance the art of gas spring devices, such as, for example, by providing for reduced weight, improved performance and/or reduced cost of manufacture.

BRIEF SUMMARY

One example of an end member in accordance with the subject matter of the present disclosure that is dimensioned for securement to an associated flexible wall for forming an associated gas spring assembly can include an end member body and an insert. The end member body can have a longitudinal axis, and can include an end wall disposed transverse to the axis and a bumper mount that is integrally formed from a common material as the end wall and projecting from along the end wall in a first axial direction. An insert can be embedded within the end member body. The insert can have an axial length and can be disposed in a lengthwise orientation within at least a portion of the bumper mount and at least a portion of the end wall such that the insert is operative to reinforce at least one of the bumper mount and an interconnection between the bumper mount and the end wall.

Another example of an end member in accordance with the subject matter of the present disclosure that is dimensioned for securement to an associated flexible wall for forming an associated gas spring assembly can include an end member body. The end member body can have a longitudinal axis and can include an end wall disposed transverse to the axis. The end member body can also include a bumper mount integrally formed from a common material as the end wall and projecting from along the end wall in a first axial direction.

One example of a gas spring assembly in accordance with the subject matter of the present disclosure can include a flexible wall having a longitudinal axis and extending peripherally about the longitudinal axis and lengthwise between opposing first and second ends to at least partially define a spring chamber. A first end member can be secured across the first end of the flexible wall. A second end member according to either one of the foregoing two paragraphs can be secured across the second end of the flexible wall such that the spring chamber is at least partially defined by the flexible wall between the first and second end members.

One example of a suspension system in accordance with the subject matter of the present disclosure can include at least one gas spring assembly according to the foregoing paragraph, and a pressurized gas system operative to selectively transfer pressurized gas into and out of the at least one gas spring assembly.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
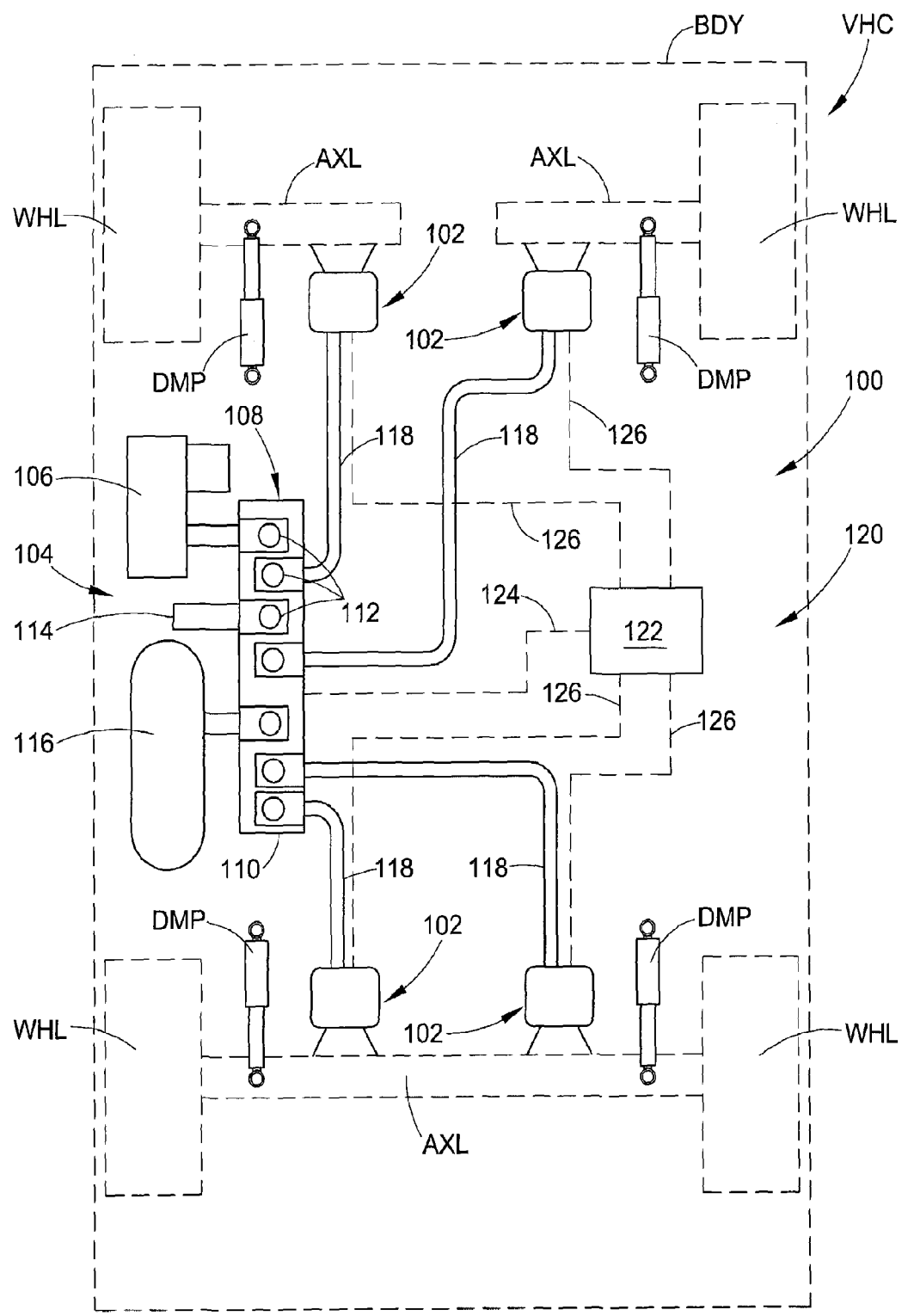
FIG. 1 is a schematic representation of one example of a suspension system of an associated vehicle including a gas spring assembly in accordance with the subject matter of the present disclosure.

FIG. 1 illustrates one example of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner. Additionally, it will also be appreciated that such a suspension system of the vehicle can also optionally include a plurality of damping members, such as dampers DMP, for example, and that any such damping members can also be operatively connected between the sprung and unsprung masses of the associated vehicle in any suitable manner.

The suspension system can also include a plurality of gas spring assemblies supported between the sprung and unsprung masses of the associated vehicle. In the arrangement shown in FIG. 1, suspension system 100 includes four gas spring assemblies 102, one of which is disposed toward each corner of the associated vehicle adjacent a corresponding wheel WHL. However, it will be appreciated that any other suitable number of gas spring assemblies could alternately be used in any other configuration or arrangement. As shown in FIG. 1, gas spring assemblies 102 are supported between axles AXL and body BDY of associated vehicle VHC. Additionally, it will be recognized that the gas spring assemblies shown and described in FIG. 1 (e.g., gas spring assemblies 102) are illustrated as being of a rolling lobe-type construction. It is to be understood, however, that gas spring assemblies of other types, kinds and/or constructions could alternately be used.

Suspension system 100 also includes a pressurized gas system 104 operatively associated with the gas spring assemblies for selectively supplying pressurized gas (e.g., air) thereto and selectively transferring pressurized gas therefrom. In the exemplary embodiment shown in FIG. 1, pressurized gas system 104 includes a pressurized gas source, such as a compressor 106, for example, for generating pressurized air or other gases. A control device, such as a valve assembly 108, for example, is shown as being in communication with compressor 106 and can be of any suitable configuration or arrangement. In the exemplary embodiment shown, valve assembly 108 includes a valve block 110 with a plurality of valves 112 supported thereon. Valve assembly 108 can also optionally include a suitable exhaust, such as a muffler 114, for example, for venting pressurized gas from the system. Optionally, pressurized gas system 104 can also include a reservoir 116 in fluid communication with the compressor and/or valve assembly 108 and suitable for storing pressurized gas.

Valve assembly 108 is in communication with gas spring assemblies 102 through suitable gas transfer lines 118. As such, pressurized gas can be selectively transferred into and/or out of the gas spring assemblies through valve assembly 108 by selectively operating valves 112, such as to alter or maintain vehicle height at one or more corners of the vehicle, for example.

Suspension system 100 can also include a control system 120 that is capable of communication with any one or more systems and/or components (not shown) of vehicle VHC and/or suspension system 100, such as for selective operation and/or control thereof. Control system 120 can include a controller or electronic control unit (ECU) 122 communicatively coupled with compressor 106 and/or valve assembly 108, such as through a conductor or lead 124, for example, for selective operation and control thereof, which can include supplying and exhausting pressurized gas to and/or from gas spring assemblies 102. Controller 122 can be of any suitable type, kind and/or configuration.

Control system 120 can also, optionally, include one or more height (or distance) sensing devices (not shown in FIG. 1), such as, for example, may be operatively associated with the gas spring assemblies and capable of outputting or otherwise generating data, signals and/or other communications having a relation to a height of the gas spring assemblies or a distance between other components of the vehicle. Such height sensing devices can be in communication with ECU 122, which can receive the height or distance signals therefrom. The height sensing devices can be in communication with ECU 122 in any suitable manner, such as through conductors or leads 126, for example. Additionally, it will be appreciated that the height sensing devices can be of any suitable type, kind and/or construction.

Figure 2:
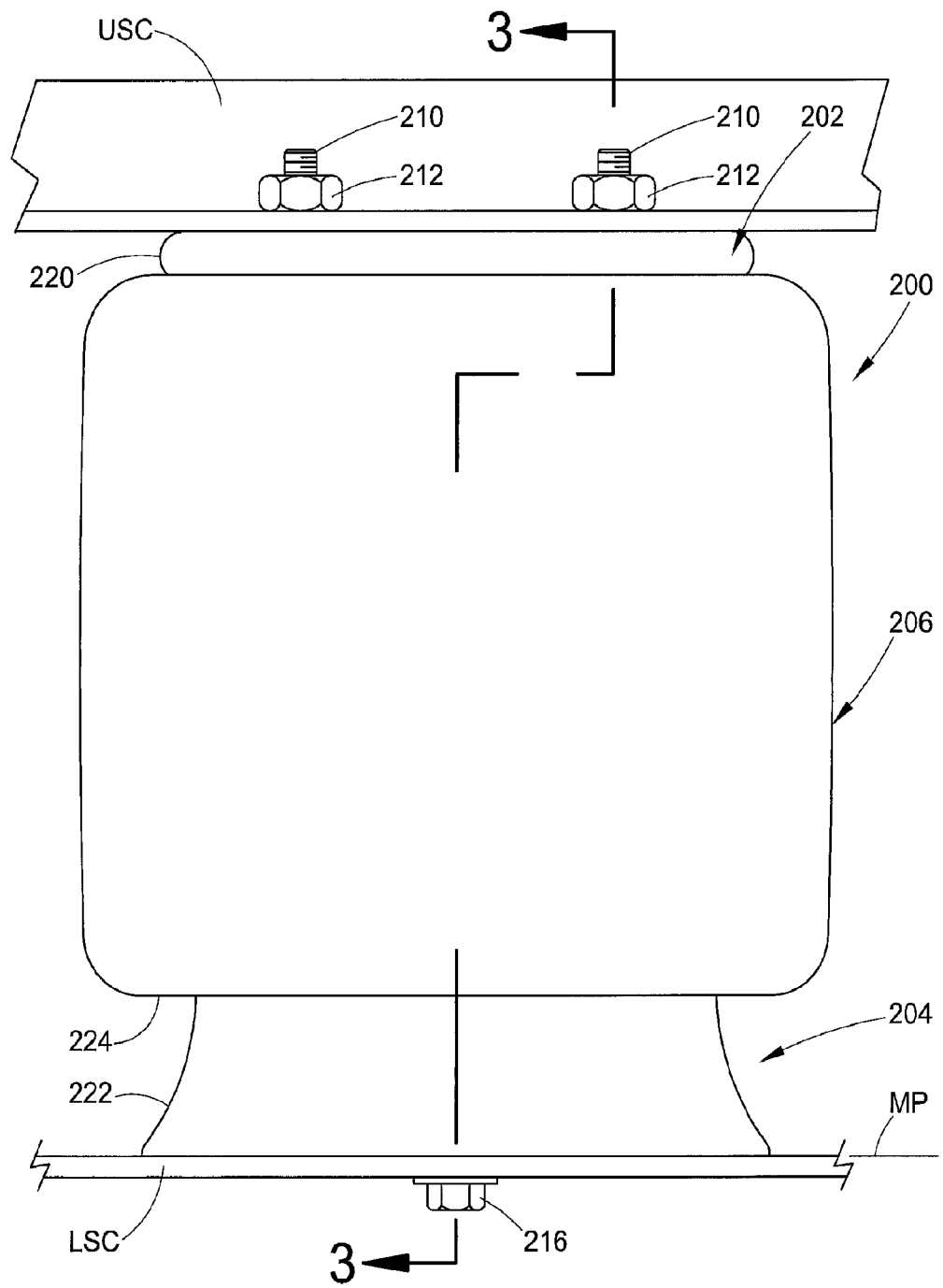
FIG. 2 is a side elevation view of one example of a gas spring assembly that includes one example of an end member in accordance with the subject matter of the present disclosure.
Figure 3:
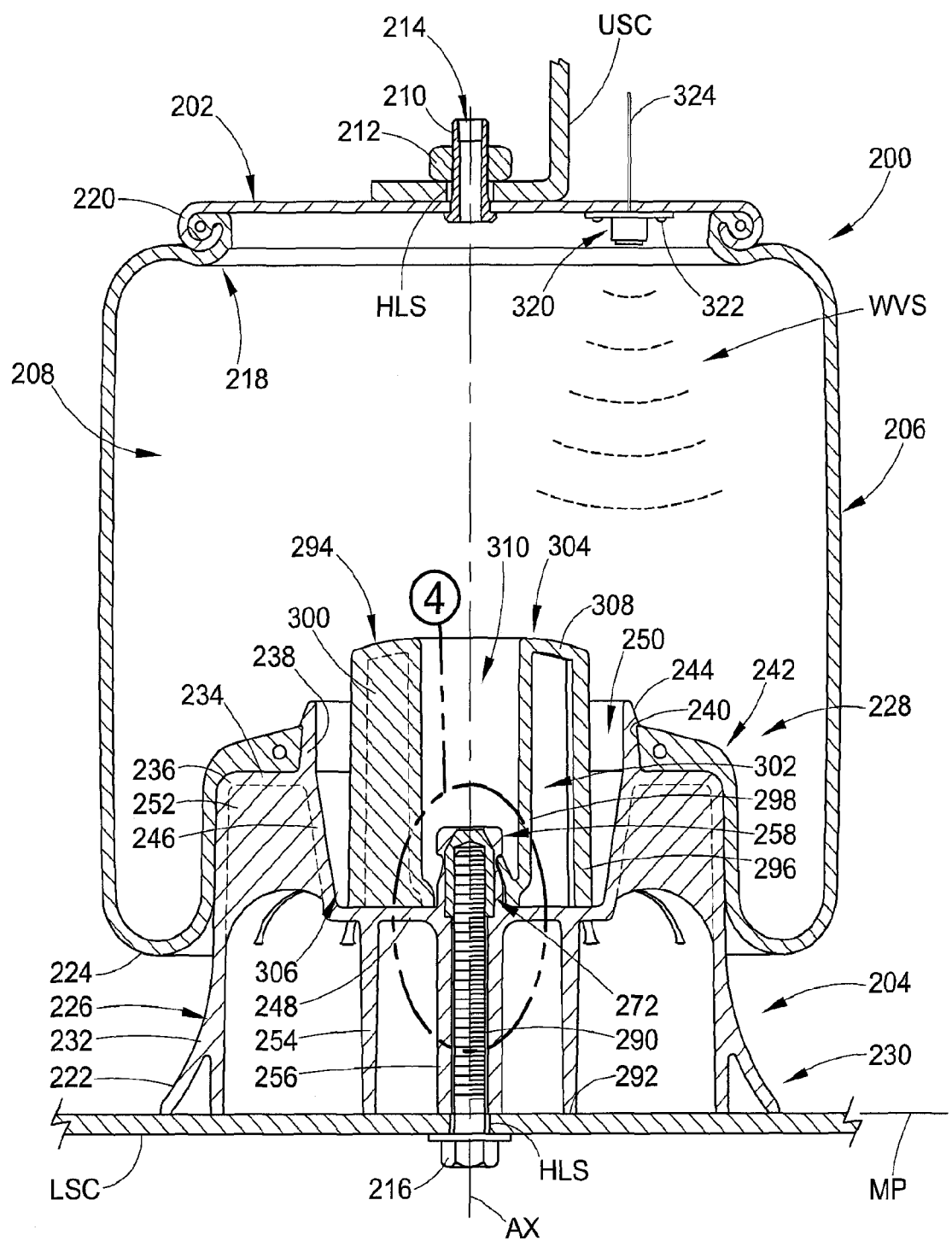
FIG. 3 is a cross-sectional side view of the gas spring assembly in FIG. 2 taken from along line 3-3 in FIG. 2.
Figure 4:
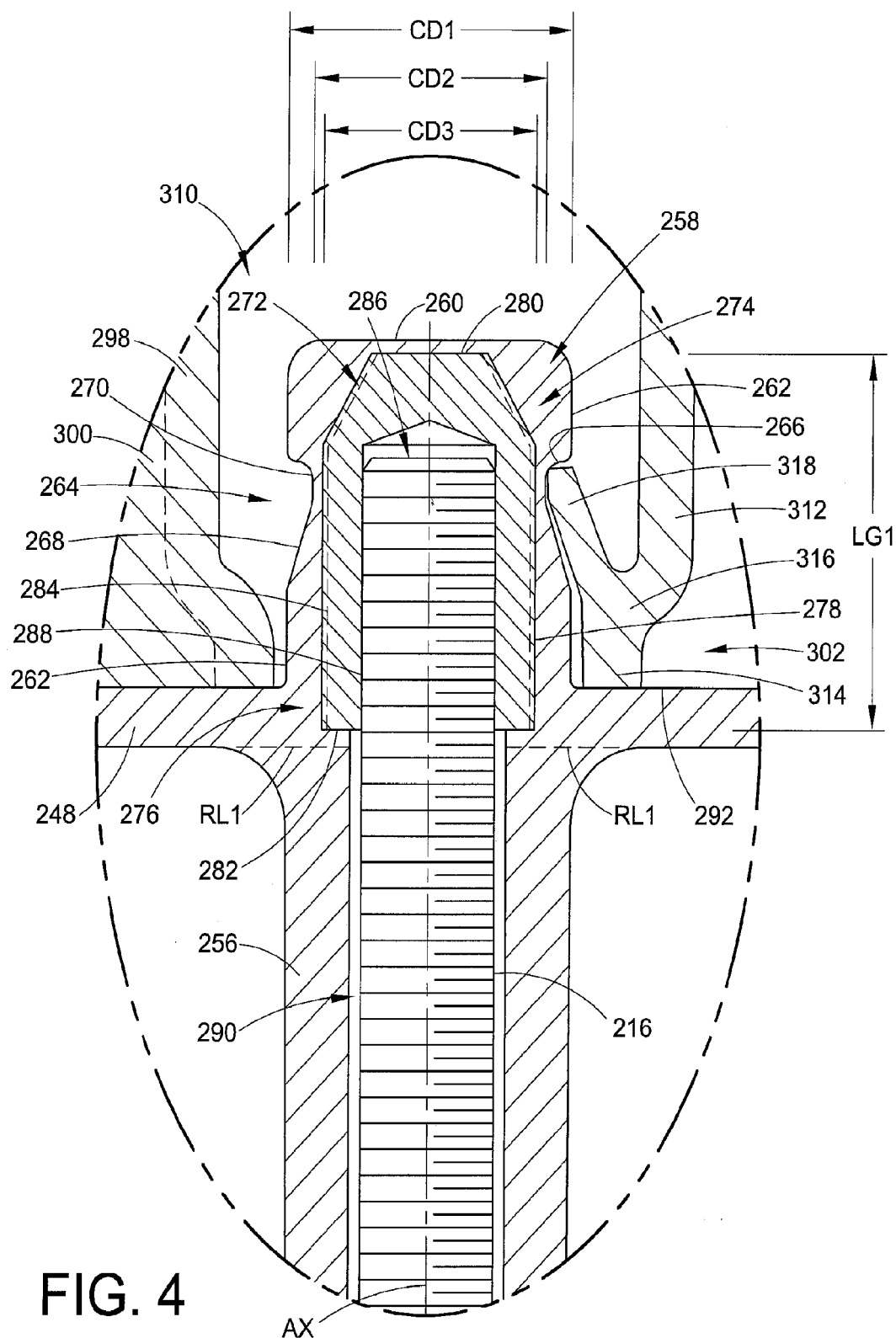
FIG. 4 is a greatly enlarged view of the portion of the end member and jounce bumper identified as Detail 4 in FIG. 3.

One example of a gas spring assembly 200 in accordance with the subject matter of the present disclosure, such as may be suitable for use as one of gas spring assemblies 102 in FIG. 1, for example, is shown in FIGS. 2-4 as having a longitudinally-extending axis AX (FIG. 3) and can include one or more end members, such as an end member 202 and an end member 204 that is spaced longitudinally from end member 202. A flexible wall 206 can extend peripherally around axis AX and can be secured between the end members in a substantially fluid-tight manner such that a spring chamber 208 (FIG. 3) is at least partially defined therebetween.

Gas spring assembly 200 can be disposed between associated sprung and unsprung masses of an associated vehicle in any suitable manner. For example, one end member can be operatively connected to the associated sprung mass with the other end member disposed toward and operatively connected to the associated unsprung mass. In the embodiment shown in FIGS. 2 and 3, for example, end member 202 is secured along a first or upper structural component USC, such as associated vehicle body BDY in FIG. 1, for example, and can be secured thereon in any suitable manner. For example, one or more securement devices, such as mounting studs 210, for example, can be included along end member 202. In some cases, the one or more securement devices (e.g., mounting studs 210) can project outwardly from end member 202 and can be secured thereon in a suitable manner, such as, for example, by way of a flowed-material joint (not shown) or a press-fit connection (not identified). Additionally, such one or more securement devices can extend through mounting holes HLS in upper structural component USC and receive one or more threaded nuts 212 or other securement devices, for example. As an alternative to one or more of mounting studs 210, one or more threaded passages (e.g., blind passages and/or through passages) could be used in conjunction with a corresponding number of one or more threaded fasteners.

Additionally, a fluid communication port, such as a transfer passage 214 (FIG. 3), for example, can optionally be provided to permit fluid communication with spring chamber 208, such as may be used for transferring pressurized gas into and/or out of the spring chamber, for example. In the exemplary embodiment shown, transfer passage 214 extends through at least one of mounting studs 210 and is in fluid communication with spring chamber 208. It will be appreciated, however, that any other suitable fluid communication arrangement could alternately be used.

End member 204 can be secured along a second or lower structural component LSC, such as an axle AXL in FIG. 1, for example, in any suitable manner. As one example, lower structural component LSC could include one or more mounting holes HLS extending therethrough. In such case, a threaded fastener 216 could extend through one of mounting holes HLS and threadably engage end member 204 to secure the end member on or along the lower structural component.

It will be appreciated that the one or more end members can be of any suitable type, kind, construction and/or configuration, and can be operatively connected or otherwise secured to the flexible wall in any suitable manner. In the exemplary arrangement shown in FIGS. 2-4, for example, end member 202 is of a type commonly referred to as a bead plate and is secured to a first end 218 of flexible wall 206 using a crimped-edge connection 220. End member 204 is shown in the exemplary arrangement in FIGS. 2 and 3 as being of a type commonly referred to as a piston (or a roll-off piston) that has an outer surface 222 that abuttingly engages flexible wall 206 such that a rolling lobe 224 is formed therealong. As gas spring assembly 200 is displaced between extended and collapsed conditions, rolling lobe 224 is displaced along outer surface 222 in a conventional manner.

As identified in FIG. 3, end member 204 includes an end member body 226 and extends from along a first or upper end 228 toward a second or lower end 230 that is spaced longitudinally from end 228. Body 226 includes a longitudinally-extending outer side wall 232 that extends peripherally about axis AX and at least partially defines outer surface 222. An end wall 234 is disposed transverse to axis AX and extends radially inward from along a shoulder portion 236, which is disposed along the outer side wall toward end 228. Body 226 also includes a first inner side wall 238 that extends longitudinally outward beyond end wall 234 and peripherally about axis AX. First inner side wall 238 has an outer surface 240 that is dimensioned to receive a second end 242 of flexible wall 206 such that a substantially fluid-tight seal can be formed therebetween. A retaining ridge 244 can project radially outward from along first inner side wall 238 and can extend peripherally along at least a portion thereof.

Body 226 also includes a second inner side wall 246 that extends longitudinally inward into the body from along end wall 234. Second inner side wall 246 terminates at an end or bottom wall 248 that is approximately planar and disposed transverse to axis AX such that second inner side wall 246 and bottom wall 248 at least partially define a cavity 250 within body 226. In some cases, bridge walls 252 can, optionally, extend between and operatively interconnect outer side wall 232 and second inner side wall 246.

An inner support wall 254 is disposed radially inward from outer side wall 232 and extends peripherally about axis AX. In some cases, inner support wall 254 can form a hollow column-like structure that projects from along bottom wall 248 in a longitudinal direction toward end 230. In some cases, the distal end of outer side wall 232 and/or the distal end of inner support wall 254 can at least partially define a mounting plane MP formed along end 230 of the end member body. In this manner, body 226 can be supported at least in part by outer side wall 232 and/or inner support wall 254, such as on or along an associated structural member (e.g., lower structural component LSC in FIGS. 2 and 3). In some cases, axially applied loads or forces transmitted to bottom wall 248, such as from impacts imparted on a jounce bumper, for example, can be reacted, communicated or otherwise at least partially transferred to the associated mounting structure by the inner support wall.

Body 226 can also include a central or support post wall 256 that is disposed radially inward from inner support wall 254 and forms a post-like structure that projects from along bottom wall 248 in a direction toward end 230. In some cases, central wall 256 can terminate in approximate alignment with mounting plane MP, such as is illustrated in FIG. 3, for example.

An end member in accordance with the subject matter of the present disclosure can differ from conventional gas spring piston constructions in that an end member in accordance with the subject matter of the present disclosure can include an integrally formed mounting feature for receiving and retaining an associated jounce bumper. That is, the end member body including the mounting feature and other walls, features and elements of the end member can be unitarily formed from a common polymeric material. Whereas, conventional gas spring pistons are assembled together with a bumper mount that is provided separately and secured on or along the gas spring pistons together with other components.

Additionally, an end member in accordance with the subject matter of the present disclosure can differ from conventional gas spring piston constructions in that an end member in accordance with the subject matter of the present disclosure can, optionally, include a reinforcing element that is at least partially embedded or otherwise disposed within at least a portion of the integrally formed mounting feature.

Furthermore, an end member in accordance with the subject matter of the present disclosure can differ from conventional gas spring piston constructions in that an end member in accordance with the subject matter of the present disclosure can, optionally, include a reinforcing element that is that is at least partially embedded or otherwise disposed within at least a portion of the integrally formed mounting feature, and that is dimensioned or otherwise configured to function as a mounting and/or securement feature of at least the end member.

In a preferred arrangement, an end member in accordance with the subject matter of the present disclosure can be formed from a polymeric material by way of a process that permits the bumper mount to be integrally formed with other features of the end member, such as the outer side wall, the end wall and/or the central wall, for example. It will be appreciated that the end member can be formed from any suitable material or combination of materials. For example, end member 204 can be formed from a substantially rigid polymeric material, such as a fiber-reinforced polypropylene, a fiber-reinforced polyamide, or an unreinforced (i.e., relatively high-strength) thermoplastic (e.g., polyester, polyethylene, polyamide, polyether or any combination thereof), for example.

One example of an end member in accordance with the subject matter of the present disclosure is shown and described herein as end member 204. In the exemplary arrangement shown in FIGS. 3 and 4, for example, body 226 of end member 204 includes a bumper mount 258 that is disposed along bottom wall 248 and projects outwardly therefrom in an axial direction toward end 228 of the end member body. As is shown in greater detail in FIG. 4, bumper mount 258 extends longitudinally from bottom wall 248 to an end surface 260. Bumper mount 258 can also include a side surface 262 that extends generally longitudinally from bottom wall 248 toward end surface 260. Bumper mount 258 can further include a groove 264 that extends radially inward into the bumper mount from along side surface 262.

Groove 264 can be of any suitable size, shape and/or configuration operative to receive and retain an associated jounce bumper thereon. For example, as shown in FIGS. 3 and 4, groove 264 can include a first or upper portion 266 disposed toward end surface 260, a second or lower portion 268 that is spaced from the first portion and a third or intermediate portion 270 that is disposed therebetween. In the exemplary arrangement shown in FIGS. 3 and 4, portion 266 has a curved shape or profile that functions as an end or shoulder of the groove, portion 270 is approximately cylindrical in shape and extend in approximate alignment with longitudinal axis AX, and portion 268 is tapered or frustoconical in shape and acts to transition from portion 270 to side surface 262. It will be appreciated, however, that such a construction is merely exemplary and that other suitable arrangements and/or configurations could alternately be used.

Additionally, bumper mount 258 can have a cross-sectional dimension, such as is represented by reference dimension CD1 in FIG. 4, for example, that can correspond to a width, diameter or other geometric characteristic of the bumper mount. The bumper mount can also have a cross-sectional dimension, such as is represented by reference dimension CD2 in FIG. 4, for example, that can correspond to a width, diameter or other geometric characteristic of the bumper mount across at least a portion of groove 264. It will be recognized and appreciated that groove 264 extends into bumper mount 258 such that cross-sectional dimension CD2 of groove 264 is less than cross-sectional dimension CD1 of bumper mount 258 across side surfaces 262.

As indicated above, end member 204 can, in some cases, include one or more features and/or components suitable for reinforcing bumper mount 258 and/or reinforcing the connection between bumper mount 258 and one or more walls of end member body 226, such as one or more of an end wall (e.g., bottom wall 248) and/or a support wall (e.g., central wall 256) of the end member body. Additionally, or in the alternative, end member 204 can include one or more features and/or components dimensioned or otherwise adapted for use in securing the end member on or along an associated structural component. In a preferred arrangement, a single feature and/or component can operate to perform both of such functions. It will be appreciated that any one of variety of different configurations and/or constructions can be used without departing from the subject matter of the present disclosure.

One example of a construction in accordance with the subject matter of the present disclosure is shown in FIGS. 2-4 in which end member 204 includes an insert 272 that is embedded (e.g., molded) into or otherwise captured and retained within end member body 226. As identified in FIG. 4, insert 272 includes an insert body (not numbered) that has an overall length LG1 and extends in a lengthwise direction between opposing ends 274 and 276. Insert 272 includes an outer surface 278 extending lengthwise between ends 274 and 276 as well as opposing end surfaces 280 and 282. The insert body also has a cross-sectional dimension, such as is represented by reference dimension CD3 in FIG. 4, for example, that can correspond to a width, diameter or other geometric characteristic of the insert body.

As indicated above, insert 272 can function as a reinforcing element operative to support, strengthen or otherwise structurally enhance bumper mount 258 and/or the interface and/or connection of the bumper mount with one or more walls of the end member body (e.g., one or more of bottom wall 248 and/or central wall 256). FIG. 4 is shown as including reference lines RL1 that can approximately demarcate bottom wall 248 from central wall 256. Additionally, it will be recognized an appreciated that end surface 280 is shown as being spaced axially-inward from end surface 260 of bumper mount 258 and end surface 282 is shown as being spaced axially-inward from reference lines RL1. As such, insert 272 is disposed within bumper mount 258 and bottom wall 248 but is disposed in spaced relation to central wall 256.

In a preferred arrangement, cross-sectional dimension CD3 can be less than cross-sectional dimension CD2 of groove 264. Additionally, insert 272 can be positioned within bumper mount 258 such that at least some amount of material of the end member body (and bumper mount) is disposed along outer side surface 262, particularly in the area of the insert disposed along groove 264. In such a preferred embodiment, insert 272 can be substantially-entirely encapsulated within the material of end member body 226. In this manner, insert 272 can be maintained in fluidic isolation relative to spring chamber 208 such that the potential for pressurized gas loss from the spring chamber can be obviated or at least substantially reduced. In some cases, one or more of outer surface 278, end surface 280, end surface 282 and/or any other external features of insert 272 can include one or more features, characteristics and/or surface treatments suitable for promoting adhesion, retention and/or engagement of the material of end member body 226 with insert 272, such as is represented by dashed lines 284, for example. Non-limiting examples of such features, characteristics and/or surface treatments can include any combination of annular grooves, annular ridges, one or more helical threads, knurl patterns, chemical adhesives, and/or bonding/sizing agents.

As indicated above, insert 272 can, in some cases, also function to assist in securing the end member on or along an associated structural component, such as providing a mounting and/or securement point for the end member. It will be appreciated that any suitable configuration and/or combination of features and characteristics can be included on or along the insert to perform such functions. As one example, insert 272 can include a hole or opening 286 that can extend into the insert body from along end surface 282. In some cases, the hole or opening can extend into and through the insert such that the hole is accessible from along either end of the insert. In a preferred arrangement, however, hole 286 can be a blind or non-through hole that can provide additional surface area for engagement with the material of end member body 226 and/or can further promote fluidic isolation of insert 272 and spring chamber 208.

Additionally, the insert body can include a securement feature 288, such as one or more helical threads, for example, that is/are accessible from along end surface 282. In the arrangement shown, securement feature 288 can take the form of one or more helical threads that are cooperative with corresponding securement features (e.g., one or more helical threads formed on or along threaded fastener 216.

The insert body of insert 272 can be formed from any suitable material or combination of materials, such as one or more polymeric materials and/or one or more metal materials, for example. In a preferred arrangement, end member body 226 can be formed from a high-strength polymeric material, such as by way of an injection molding process, for example. In such cases, the insert body of insert 272 is preferably formed from a metal material, such as steel or aluminum, for example.

Additionally, in cases in which the insert is configured to assist in securing the end member on or along an associated structural component, central wall 256 can include a passage 290 that extends into the central wall from along an end surface 292 facing away from insert 272 and generally toward mounting plane MP. In a preferred arrangement, passage 290 can be in communication with hole 286 of insert 272 and can be dimensioned to receive a suitable threaded fastener (e.g., threaded fastener 216) to engage the securement feature of the insert. In this manner, the securement device (e.g., threaded fastener 216) can reach and engage insert 272, and end member 204 can be secured on or along the associate structural component (e.g., lower structural component LSC) by way of the securement device.

Figure 5:
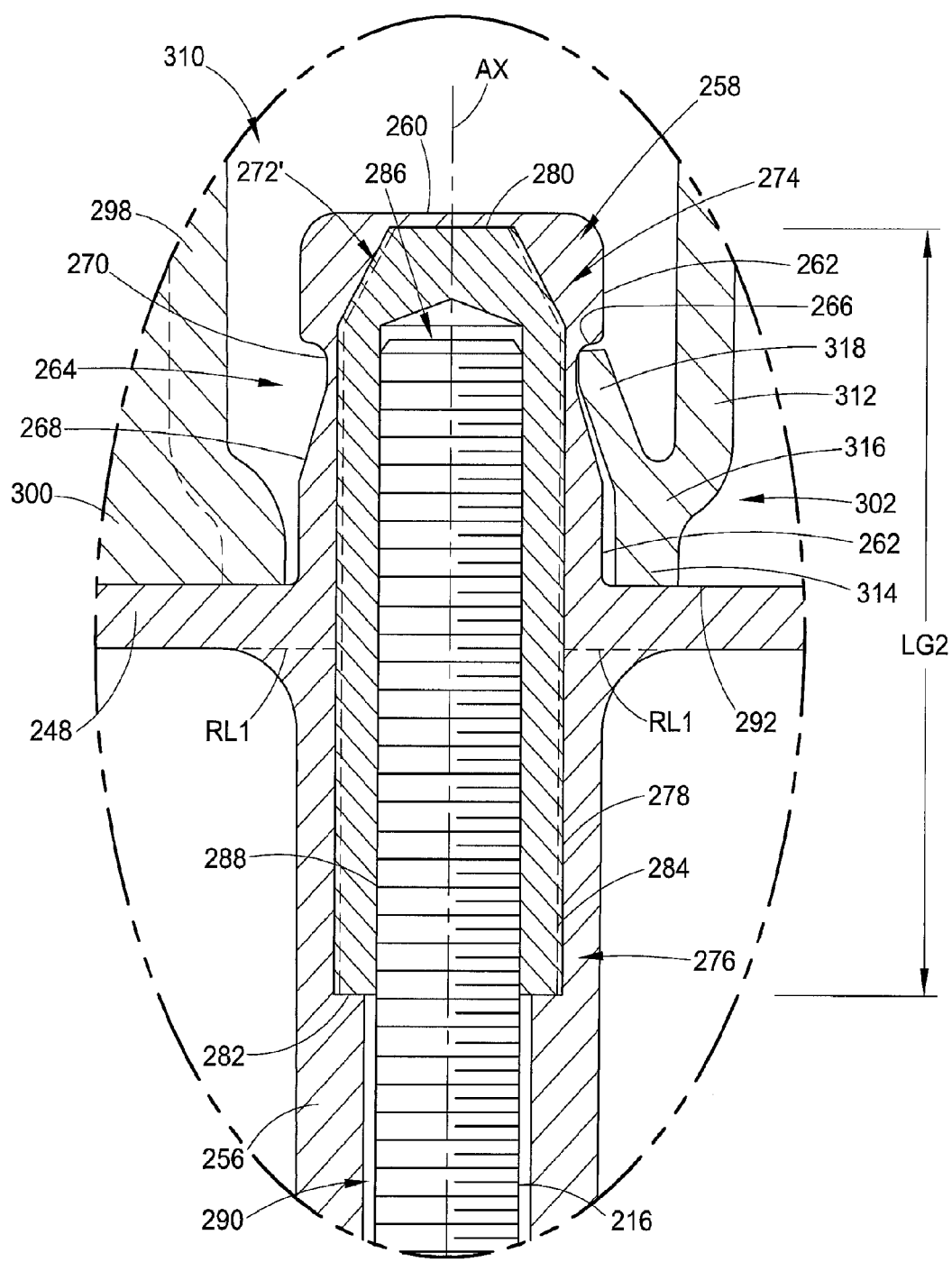
FIG. 5 is a greatly enlarged view of an alternate embodiment of the portion of the end member and jounce bumper identified as Detail 4 in FIG. 3.

Another example of a suitable construction for end member 204 is shown in FIG. 5 that includes an alternate embodiment of an insert 272'. It will be appreciated that insert 272' is substantially similar to insert 272 and, as such, like features will be referred to herein by like item numbers. Insert 272' differs from insert 272 in that insert 272' has an insert body (not numbered) with an overall length LG2 that is greater than overall length LG1 of insert 272. It will be recognized and appreciated that end 274 of insert 272' is shown in FIG. 5 as being disposed in a substantially identical position relative to end surface 260 of bumper mount 258 as end 274 of insert 272, which is shown in FIGS. 3 and 4. However, the greater length of insert 272' results in end 276 of insert 272' extending beyond reference lines RL1, which can approximately demarcate bottom wall 248, and into central wall 256. As such, insert 272' is disposed within bumper mount 258, bottom wall 248, and central wall 256 in contrast to the construction shown in FIGS. 3 and 4 in which insert 272 is disposed within bumper mount 258 and bottom wall 248 but in spaced relation to central wall 256.

Figure 6:
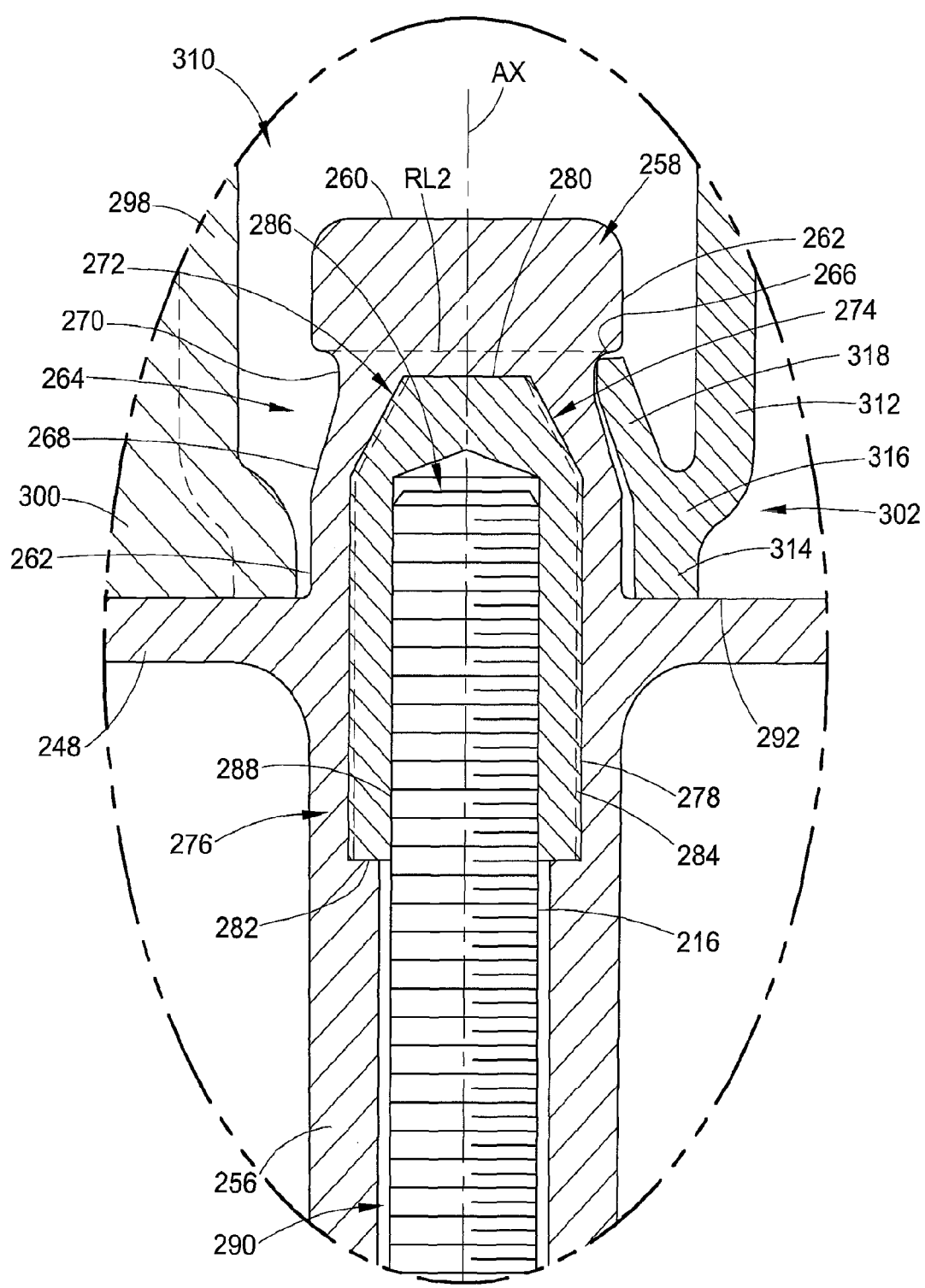
FIG. 6 is a greatly enlarged view of another alternate embodiment of the portion of the end member and jounce bumper identified as Detail 4 in FIG. 3.

With respect to the position of the insert within the bumper mount, it will be appreciated that end surface 260, a surface 292 of bottom wall 248 and/or any suitable feature of groove 264 can be used as a point of reference, such as is represented by reference line RL2 in FIG. 6 which is disposed in approximate alignment with upper portion 266 of groove 264. It will be recognized and appreciated that in FIGS. 3 and 4, for example, end surface 280 of insert 272 is disposed adjacent end surface 260 of bumper mount 258 and on an opposing side of upper portion 266 of groove 264 from bottom wall 248. In FIG. 6, however, insert 272 is shown as being disposed in an alternate position in which end surface 280 is disposed in spaced relation to end surface 260 and on the same side of reference line RL2 (and upper portion 266) as bottom wall 248. As such, insert 272 is shown in FIG. 6 as being disposed within bumper mount 258, bottom wall 248, and central wall 256 in contrast to the construction shown in FIGS. 3 and 4 in which insert 272 is disposed within bumper mount 258 and bottom wall 248 but in spaced relation to central wall 256.

Regardless of the type, kind, construction, configuration and/or position of the insert that is embedded (e.g., molded) into or otherwise captured and retained within the end member body, such as is shown in the exemplary constructions illustrated in FIGS. 3-6, gas spring assembly 200 can also, optionally, include a jounce bumper 294 that can be supported within spring chamber 208, such as to inhibit direct contact between end members 202 and 204, for example. It will be appreciated that the jounce bumper, if included, can be supported on or along an end member in any suitable manner. For example, jounce bumper 294 is shown as being received on and retained by bumper mount 258. Additionally, it will be appreciated that the jounce bumper can be of any suitable form, configuration and/or construction, and can be formed from any suitable material or combination of materials. For example, jounce bumper 294 can be formed from a substantially rigid polymeric material, such as a fiber-reinforced polypropylene, a fiber-reinforced polyamide, or an unreinforced (i.e., relatively high-strength) thermoplastic (e.g., polyester, polyethylene, polyamide, polyether or any combination thereof), for example.

In the exemplary arrangement shown in FIGS. 3 and 4, jounce bumper 294 includes an outer side wall 296 and an inner side wall 298 that is disposed in radially inwardly-spaced relation to outer side wall 296 such that at least one cavity is defined between the inner and outer side walls. As identified in FIG. 3, jounce bumper 294 can optionally include a plurality of connector walls 300 that extend between and operatively interconnect outer and inner side walls 296 and 298, and thereby at least partially define a plurality of cavities 302 disposed in circumferentially-spaced relation to one another along the inner and outer side walls and about axis AX.

Outer and inner side walls 296 and 298 extend longitudinally between opposing ends 304 (FIG. 3) and 306 (FIG. 3) of jounce bumper 294. An end wall 308 extends between the outer and inner side walls along end 304 and thereby at least partially forms a closed end of cavities 302. In the exemplary arrangement shown, cavities 302 are open along end 306, which is disposed adjacent surface 292 of bottom wall 248. It will be appreciated, however, that other arrangements and/or configurations could alternately be used.

Inner side wall 298 extends peripherally about axis AX such that a central cavity 310 is at least partially defined within jounce bumper 294. In the exemplary arrangement shown in FIGS. 3-6, inner side wall 298 is shown as having a first or upper portion 312 and a second or lower portion 314. Second portion 314 is shown as being radially inward positioned relative to first portion 312 such that a transition portion 316 is disposed therebetween. It will be appreciated, however, that any other suitable arrangement and/or configuration could alternately be used.

Jounce bumper 294 is positioned within spring chamber 208 and along the end member 204 such bumper mount 258 is received within central cavity 310. In a preferred arrangement, at least a portion of inner side wall 298 is disposed in abutting engagement (though shown in FIGS. 4-6 slightly spaced apart for purposes of clarity of illustration) with side surface 266 of the bumper mount. Such a configuration can be achieved in any suitable manner. As one example, second portion 314 of the inner side wall could be dimensioned to compressively fit or otherwise disposed in abutting engagement with the side surface of the bumper mount. Additionally, jounce bumper 294 can include a plurality of retaining fingers or projections 318 that extend into central cavity 310 from along inner side wall 298, such as, for example, by projecting from along second portion 314 adjacent transition portion 316.

In an installed condition of jounce bumper 294, retaining fingers 318 project radially inward from along the inner side wall and operatively interengage bumper mount 258, such as within groove 264 thereof, for example, such that the jounce bumper is axially retained thereon, such as by being restrained from axial displacement relative to the end member (e.g., end member 204) along which the jounce bumper is secured. It will be appreciated that the retaining fingers can vary in circumferential size, circumferential position relative to one another (e.g., spacing between adjacent retaining fingers) and quantity depending upon a variety of factors that may vary from application to application. For example, a number of retaining fingers 318 within a range of from two (2) to fifty (50) retaining fingers could be used.

A height or distance sensing device 320 is, optionally, shown in FIGS. 2 and 3 as being disposed within spring chamber 208 along end member 202 and being secured thereto using suitable fasteners 322. Height sensing device 320 can be of any suitable type, kind and/or construction, such as an ultrasonic sensor that transmits and receives ultrasonic waves WVS (FIG. 3), for example. Additionally, it will be appreciated that height sensing device 320 can be connected to other systems and/or components of a vehicle suspension system in any suitable manner. As shown in FIGS. 2 and 3, height sensing device 320 includes a lead or connection 324 that can be used for such communication purposes, such as is indicated by leads 126 of control system 120 in FIG. 1, for example.

Figure 7:
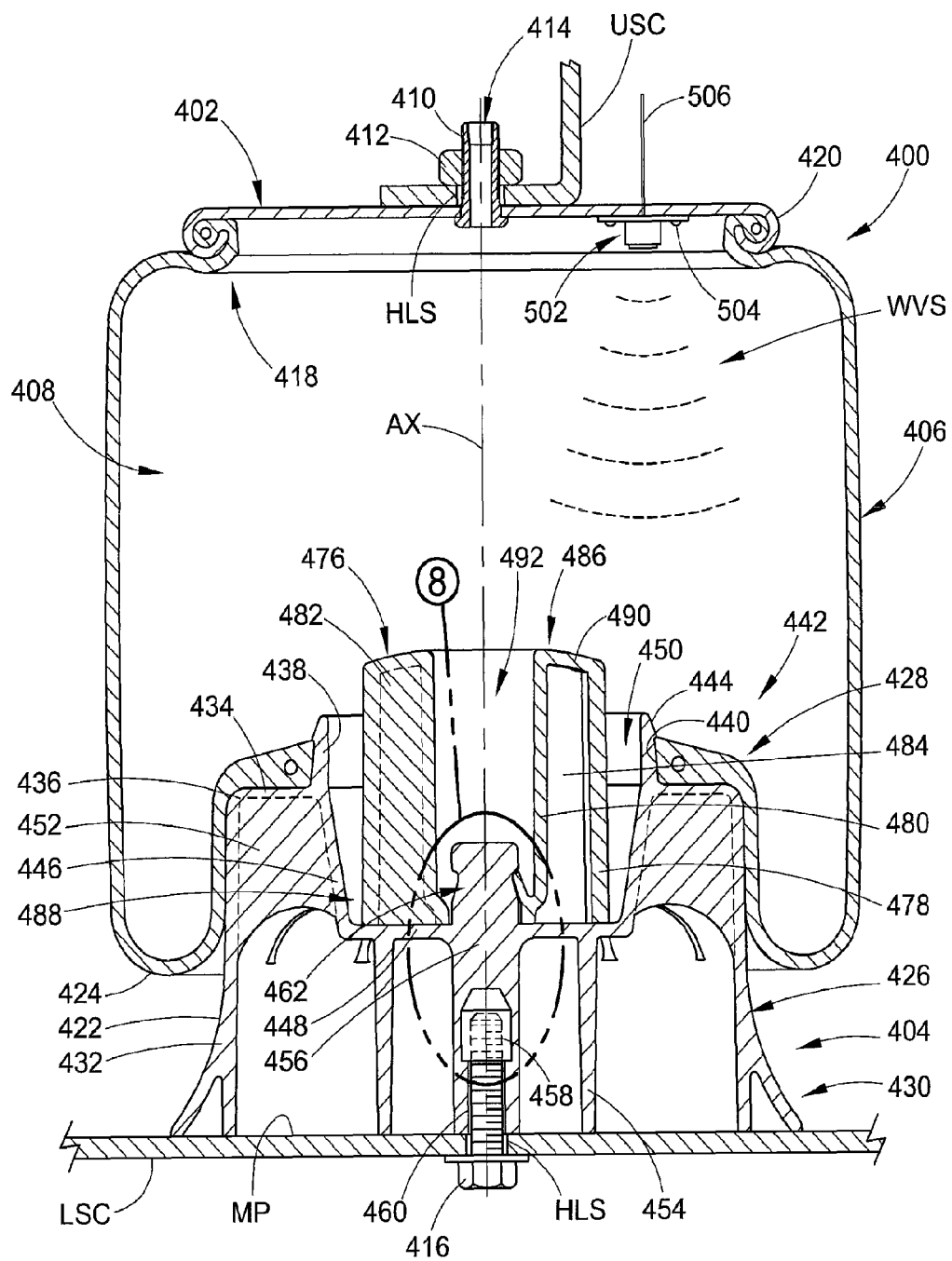
FIG. 7 illustrates another example of a gas spring assembly that includes another example of an end member in accordance with the subject matter of the present disclosure shown in cross section, such as taken from along line 3-3 in FIG. 2.
Figure 8:
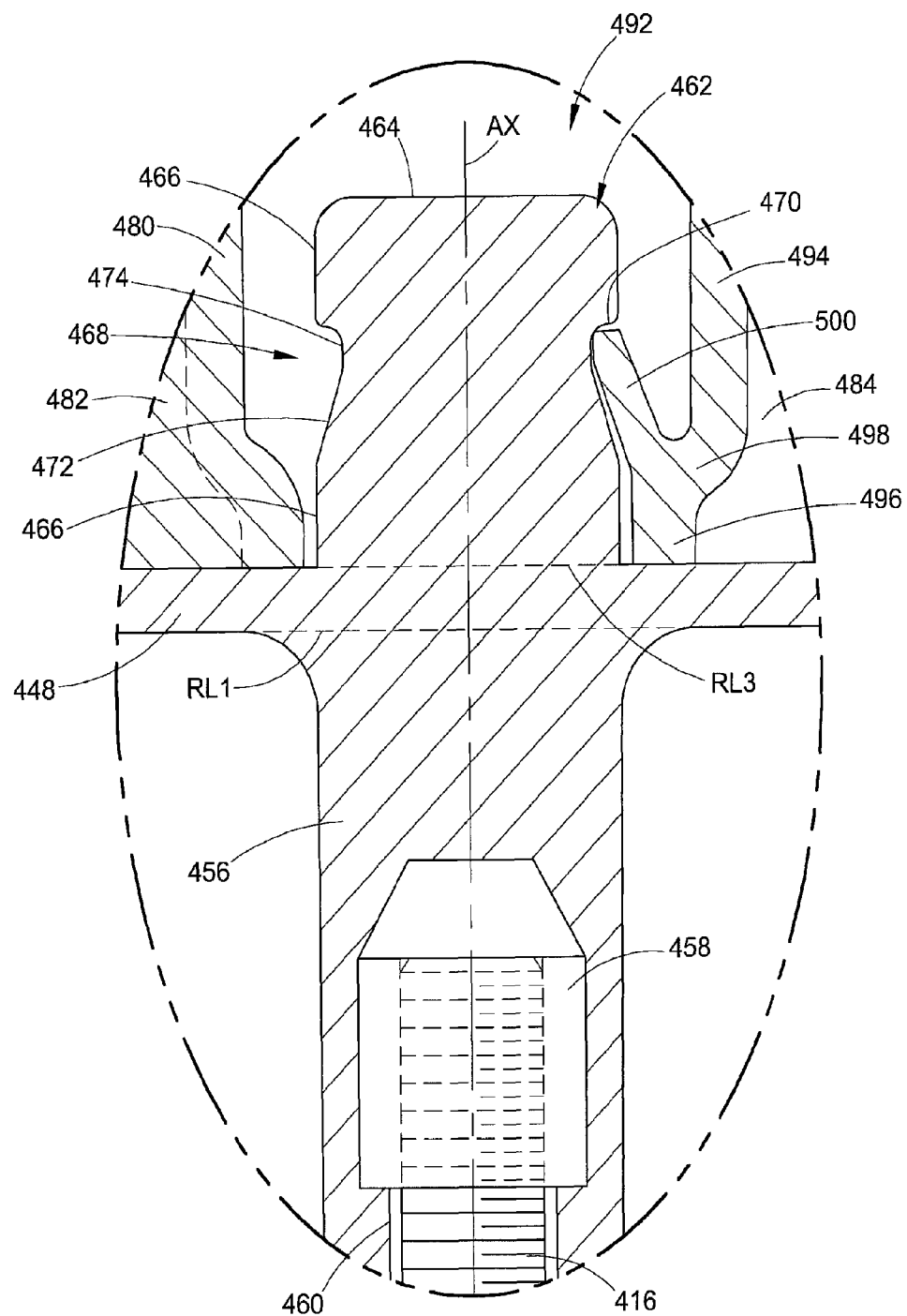
FIG. 8 is a greatly enlarged view of the portion of the end member and jounce bumper identified as Detail 8 in FIG. 7.

Another example of a gas spring assembly 400 in accordance with the subject matter of the present disclosure, such as may be suitable for use as one of gas spring assemblies 102 in FIG. 1, for example, is shown in FIGS. 7 and 8 as having a longitudinally-extending axis AX (FIG. 7) and can include one or more end members, such as an end member 402 and an end member 404 that is spaced longitudinally from end member 402. A flexible wall 406 can extend peripherally around axis AX and can be secured between the end members in a substantially fluid-tight manner such that a spring chamber 408 (FIG. 7) is at least partially defined therebetween.

Gas spring assembly 400 can be disposed between associated sprung and unsprung masses of an associated vehicle in any suitable manner. For example, one end member can be operatively connected to the associated sprung mass with the other end member disposed toward and operatively connected to the associated unsprung mass. In the embodiment shown in FIGS. 7 and 8, for example, end member 402 is secured along a first or upper structural component USC, such as associated vehicle body BDY in FIG. 1, for example, and can be secured thereon in any suitable manner. For example, one or more securement devices, such as mounting studs 410, for example, can be included along end member 402. In some cases, the one or more securement devices (e.g., mounting studs 410) can project outwardly from end member 402 and can be secured thereon in a suitable manner, such as, for example, by way of a flowed-material joint (not shown) or a press-fit connection (not identified). Additionally, such one or more securement devices can extend through mounting holes HLS in upper structural component USC and receive one or more threaded nuts 412 or other securement devices, for example. As an alternative to one or more of mounting studs 410, one or more threaded passages (e.g., blind passages and/or through passages) could be used in conjunction with a corresponding number of one or more threaded fasteners.

Additionally, a fluid communication port, such as a transfer passage 414 (FIG. 7), for example, can optionally be provided to permit fluid communication with spring chamber 408, such as may be used for transferring pressurized gas into and/or out of the spring chamber, for example. In the exemplary embodiment shown, transfer passage 414 extends through at least one of mounting studs 410 and is in fluid communication with spring chamber 408. It will be appreciated, however, that any other suitable fluid communication arrangement could alternately be used.

End member 404 can be secured along a second or lower structural component LSC, such as an axle AXL in FIG. 1, for example, in any suitable manner. As one example, lower structural component LSC could include one or more mounting holes HLS extending therethrough. In such case, a threaded fastener 416 could extend through one of mounting holes HLS and threadably engage end member 404 to secure the end member on or along the lower structural component.

It will be appreciated that the one or more end members can be of any suitable type, kind, construction and/or configuration, and can be operatively connected or otherwise secured to the flexible wall in any suitable manner. In the exemplary arrangement shown in FIGS. 7 and 8, for example, end member 402 is of a type commonly referred to as a bead plate and is secured to a first end 418 of flexible wall 406 using a crimped-edge connection 420. End member 404 is shown in the exemplary arrangement in FIGS. 7 and 8 as being of a type commonly referred to as a piston (or a roll-off piston) that has an outer surface 422 that abuttingly engages flexible wall 406 such that a rolling lobe 424 is formed therealong. As gas spring assembly 400 is displaced between extended and collapsed conditions, rolling lobe 424 is displaced along outer surface 422 in a conventional manner.

As identified in FIG. 7, end member 404 includes an end member body 426 and extends from along a first or upper end 428 toward a second or lower end 430 that is spaced longitudinally from end 428. Body 426 includes a longitudinally-extending outer side wall 432 that extends peripherally about axis AX and at least partially defines outer surface 422. An end wall 434 is disposed transverse to axis AX and extends radially-inwardly from along a shoulder portion 436, which is disposed along the outer side wall toward end 428. Body 426 also includes a first inner side wall 438 that extends longitudinally-outwardly beyond end wall 434 and peripherally about axis AX. First inner side wall 438 has an outer surface 440 that is dimensioned to receive a second end 442 of flexible wall 406 such that a substantially fluid-tight seal can be formed therebetween. A retaining ridge 444 can project radially-outwardly from along first inner side wall 438 and can extend peripherally along at least a portion thereof.

Body 426 also includes a second inner side wall 446 that extends longitudinally-inwardly into the body from along end wall 434. Second inner side wall 446 terminates at a bottom wall 448 that is approximately planar and disposed transverse to axis AX such that second inner side wall 446 and bottom wall 448 at least partially define a cavity 450 within body 426. In some cases, bridge walls 452 can, optionally, extend between and operatively interconnect outer side wall 432 and second inner side wall 446.

An inner support wall 454 is disposed radially-inwardly from outer side wall 432 and extends peripherally about axis AX. In some cases, inner support wall 454 can form a hollow column-like structure that projects from along bottom wall 448 in a longitudinal direction toward end 430. In some cases, the distal end of outer side wall 432 and/or the distal end of inner support wall 454 can at least partially define a mounting plane MP formed along end 430 of the end member body. In this manner, body 426 can be supported at least in part by outer side wall 432 and/or inner support wall 454, such as on or along an associated structural member (e.g., lower structural component LSC in FIG. 7). In some cases, axially applied loads or forces transmitted to bottom wall 448, such as from impacts imparted on a jounce bumper, for example, can be reacted, communicated or otherwise at least partially transferred to the associated mounting structure by the inner support wall.

Body 426 can also include a central wall 456 that is disposed radially-inwardly from inner support wall 454 and forms a post-like structure that projects from along bottom wall 448 in a direction toward end 430. In some cases, central wall 456 can terminate in approximate alignment with mounting plane MP, such as is illustrated in FIG. 7, for example. End member 404 can optionally include one or more features or components suitable for use in securing the end member on or along an associated structural component. As one example, a threaded insert 458 can be molded into or otherwise captured and retained within central wall 456 and can be dimensioned to receive a suitable threaded fastener (e.g., threaded fastener 416) for securement of the end member on or along the associate structural component (e.g., lower structural component LSC). In some cases, a longitudinally-extending passage 460 can extend into central wall 456 from along mounting plane MP such that the threaded fastener can reach and engage insert 458 or another suitable feature.

An end member in accordance with the subject matter of the present disclosure can differ from conventional gas spring piston constructions in that an end member in accordance with the subject matter of the present disclosure can include an integrally formed mounting feature for receiving and retaining an associated jounce bumper. Whereas, conventional gas spring pistons are assembled together with a bumper mount that is provided separately and secured on or along the gas spring pistons together with other components.

In a preferred arrangement, an end member in accordance with the subject matter of the present disclosure can be formed from a polymeric material by way of a process that permits the bumper mount to be integrally formed with other features of the end member, such as the outer side wall, the end wall and/or the central wall, for example. It will be appreciated that the end member can be formed from any suitable material or combination of materials. For example, end member 404 can be formed from a substantially rigid polymeric material, such as a fiber-reinforced polypropylene, a fiber-reinforced polyamide, or an unreinforced (i.e., relatively high-strength) thermoplastic (e.g., polyester, polyethylene, polyamide, polyether or any combination thereof), for example.

One example of an end member in accordance with the subject matter of the present disclosure is shown and described herein as end member 404. In the exemplary arrangement shown in FIGS. 7 and 8, for example, body 426 of end member 404 includes a bumper mount 462 that is disposed along bottom wall 448 and projects outwardly therefrom in an axial direction toward end 428 of the end member body. As is shown in greater detail in FIG. 8, bumper mount 462 extends longitudinally from bottom wall 448 to an end surface 464. Bumper mount 460 can also include a side surface 466 that extends generally longitudinally from bottom wall 448 toward end surface 464. Bumper mount 462 can further include a groove 468 that extends radially-inwardly into the bumper mount from along side surface 466. FIG. 8 is shown as including a reference line RL1 that can approximately demarcate bottom wall 448 from central wall 456 and a reference line RL3 that can demarcate bumper mount 462 from bottom wall 448. As such, it will be recognized that insert 458 is disposed within central wall 456 but is shown as being in spaced relation to reference line RL3 and reference line RL1.

Groove 468 can be of any suitable size, shape and/or configuration operative to receive and retain an associated jounce bumper thereon. For example, as shown in FIGS. 7 and 8, groove 468 can include a first or upper portion 470 disposed toward end surface 464, a second or lower portion 472 that is spaced from the first portion, and a third or intermediate portion 474 that is disposed therebetween. In the exemplary arrangement shown in FIGS. 7 and 8, portion 470 has a curved shape or profile that functions as an end or shoulder of the groove, portion 474 is approximately cylindrical in shape and extend in approximate alignment with longitudinal axis AX, and portion 472 is tapered or frusto-conical in shape and acts to transition from portion 474 to side surface 466. It will be appreciated, however, that such a construction is merely exemplary and that other suitable arrangements and/or configurations could alternately be used.

Gas spring assembly 400 can also, optionally, include a jounce bumper 476 that can be supported within spring chamber 408, such as to inhibit direct contact between end members 402 and 404, for example. It will be appreciated that the jounce bumper, if included, can be supported on or along an end member in any suitable manner. For example, jounce bumper 476 is shown as being received on and retained by bumper mount 462. Additionally, it will be appreciated that the jounce bumper can be of any suitable form, configuration and/or construction, and can be formed from any suitable material or combination of materials. For example, jounce bumper 476 can be formed from a substantially rigid polymeric material, such as a fiber-reinforced polypropylene, a fiber-reinforced polyamide, or an unreinforced (i.e., relatively high-strength) thermoplastic (e.g., polyester, polyethylene, polyamide, polyether or any combination thereof), for example.

In the exemplary arrangement shown in FIGS. 7 and 8, jounce bumper 476 includes an outer side wall 478 and an inner side wall 480 that is disposed in radially inwardly-spaced relation to outer side wall 478 such that at least one cavity is defined between the inner and outer side walls. As identified in FIG. 7, jounce bumper 476 can optionally include a plurality of connector walls 482 that extend between and operatively interconnect outer and inner side walls 478 and 480, and thereby at least partially define a plurality of cavities 484 disposed in circumferentially-spaced relation to one another along the inner and outer side walls and about axis AX.

Outer and inner side walls 478 and 480 extend longitudinally between opposing ends 486 and 488 of jounce bumper 476. An end wall 490 extends between the outer and inner side walls along end 486 and thereby at least partially forms a closed end of cavities 484. In the exemplary arrangement shown, cavities 484 are open along end 488. It will be appreciated, however, that other arrangements and/or configurations could alternately be used.

Inner side wall 480 extends peripherally about axis AX such that a central cavity 492 is at least partially defined within jounce bumper 476. In the exemplary arrangement shown in FIGS. 7 and 8, inner side wall 480 is shown as having a first or upper portion 494 and a second or lower portion 496. Second portion 496 is shown as being radially-inwardly positioned relative to first portion 494 such that a transition portion 498 is disposed therebetween. It will be appreciated, however, that any other suitable arrangement and/or configuration could alternately be used.

Jounce bumper 476 is positioned within spring chamber 408 and along the end member 404 such bumper mount 462 is received within central cavity 492. In a preferred arrangement, at least a portion of inner side wall 480 is disposed in abutting engagement with side surface 466 of the bumper mount. Such a configuration can be achieved in any suitable manner. As one example, second portion 496 of the inner side wall could be dimensioned to compressively fit or otherwise disposed in abutting engagement with the side surface of the bumper mount. Additionally, jounce bumper 476 can include a plurality of retaining fingers or projections 500 that extend into central cavity 492 from along inner side wall 480, such as, for example, by projecting from along second portion 496 adjacent transition portion 498.

In an installed condition of jounce bumper 478, retaining fingers 500 project radially-inwardly from along the inner side wall and operatively interengage bumper mount 462 such that the jounce bumper is axially retained thereon, such as by being restrained from axial displacement relative to the end member (e.g., end member 404) along which the jounce bumper is secured. It will be appreciated that the retaining fingers can vary in circumferential size, circumferential position relative to one another (e.g., spacing between adjacent retaining fingers) and quantity depending upon a variety of factors that may vary from application to application. For example, a number of retaining fingers 500 within a range of from two (2) to fifty (50) retaining fingers could be used.

A height or distance sensing device 502 is, optionally, shown in FIG. 7 as being disposed within spring chamber 408 along end member 402 and being secured thereto using suitable fasteners 504. Height sensing device 502 can be of any suitable type, kind and/or construction, such as an ultrasonic sensor that transmits and receives ultrasonic waves WVS (FIG. 7), for example. Additionally, it will be appreciated that height sensing device 502 can be connected to other systems and/or components of a vehicle suspension system in any suitable manner. As shown in FIG. 7, height sensing device 502 includes a lead or connection 506 that can be used for such communication purposes, such as is indicated by leads 126 of control system 120 in FIG. 1, for example.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood that claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. An end member dimensioned for securement to an associated flexible wall for forming an associated gas spring assembly supportable on an associated structural component, said end member comprising:
    an end member body being at least partially formed from a polymeric material and having a longitudinal axis, said end member body including:

an end wall formed from said polymeric material and oriented transverse to said axis;

a bumper mount integrally formed with at least said end wall from said polymeric material and dimensioned to abuttingly engage an associated jounce bumper, said bumper mount projecting from along said end wall in a first axial direction; and, a mounting plane disposed in offset relation to said end wall in a second axial direction opposite said first axial direction and along which the associated structural component will abuttingly engage said end member; and, an insert embedded within said end member body, said insert having an axial length and being disposed in a lengthwise orientation within at least a portion of said bumper mount and at least a portion of said end wall.

2. An end member according to claim 1, wherein said end member body includes a support post wall extending from along said end wall in said second axial direction opposite said first axial direction, and said support post includes a passage extending axially therethrough in communication with said insert.

3. An end member according to claim 1, wherein said end member body includes a support post wall extending from along said end wall in said second axial direction, and said insert is disposed in spaced relation to said support post wall.

4. An end member according to claim 1, wherein said end member body includes a support post wall extending from along said end wall in said second axial direction, and said insert is disposed in a lengthwise orientation within at least a portion of said bumper mount, at least a portion of said end wall and at least a portion of said support post wall.

5. An end member according to claim 1, wherein said insert is formed from a metal material or a polymeric material that is different than said polymeric material of said end member body.

6. An end member according to claim 1, wherein said insert includes an outer surface and a securement feature disposed along at least a portion of said outer surface with said securement feature engaged by said end member body to retain said insert within said bumper mount.

7. An end member according to claim 1, wherein said insert includes a securement feature dimensioned to engage an associated external securement device for retaining said end member on the associated structural component.

8. An end member according to claim 1, wherein said end member body includes an inner support wall extending from said end wall in a direction opposite said bumper mount.

9. An end member according to claim 1, wherein at least one of said end wall and said bumper mount includes a passage extending axially therethrough in communication with said insert.

10. A gas spring assembly dimensioned for securement to an associated structural component, said gas spring assembly comprising:

a flexible wall having a longitudinal axis and extending peripherally about said longitudinal axis between a first end an a second end to at least partially define a spring chamber;

a first end member secured across said first end of said flexible wall; and, a second end member secured across said second end of said flexible wall such that said spring chamber is at least partially defined by said flexible wall between said first and second end members, said second end member including:

an end member body that is at least partially formed from a polymeric material, said end member body including:

an end wall formed from said polymeric material and oriented transverse to said longitudinal axis;

a bumper mount integrally formed with at least said end wall from said polymeric material and dimensioned to abuttingly engage an associated jounce bumper, said bumper mount projecting from along said end wall in a first axial direction; and, a mounting plane disposed in offset relation to said end wall in a second axial direction opposite said first axial direction and along which the associated structural component will abuttingly engage said end member; and, an insert embedded within said end member body, said insert having an axial length and being disposed in a lengthwise orientation within at least a portion of said bumper mount and at least a portion of said end wall.

11. A gas spring assembly according to claim 10 further comprising a jounce bumper secured to said second end member along said bumper mount.

12. A suspension system comprising:

at least one gas spring assembly according to claim 10; and, a pressurized gas system operative to selectively transfer pressurized gas into and out of said at least one gas spring assembly.

13. A gas spring assembly according to claim 10, wherein said end member body includes a side wall integrally formed with said end wall and said bumper mount from said polymeric material, said side wall disposed radially outward of said end wall and extending in at least one of said first axial direction and a second axial direction opposite said first axial direction relative to said end wall, said side wall including an outer surface dimensioned to abuttingly engage said flexible wall such that a rolling lobe is formed by said flexible wall along said outer surface of said side wall.

14. A gas spring assembly according to claim 10, wherein said end member body includes a support post wall extending from along said end wall in said second axial direction opposite said first axial direction, and said insert is disposed in spaced relation to said support post wall.

15. A gas spring assembly according to claim 10, wherein said end member body includes a support post wall extending from along said end wall in said second axial direction opposite said first axial direction, and said insert is disposed in a lengthwise orientation within at least a portion of said bumper mount, at least a portion of said end wall and at least a portion of said support post wall.

16. A gas spring assembly according to claim 10, wherein at least one of said end wall and said bumper mount includes a passage extending axially therethrough in communication with said insert.

17. A gas spring assembly according to claim 16, wherein said end member body includes a support post wall extending from along said end wall in said second axial direction opposite said first axial direction, said support post including a passage extending axially therethrough in communication with said insert.

18. A gas spring assembly comprising:

a flexible wall having a longitudinal axis and extending peripherally about said longitudinal axis between a first end an a second end to at least partially define a spring chamber;

a first end member secured across said first end of said flexible wall; and, a second end member secured across said second end of said flexible wall such that said spring chamber is at least partially defined by said flexible wall between said first and second end members, said second end member including:

an end member body that is at least partially formed from a polymeric material, said end member body including:

an end wall formed from said polymeric material and oriented transverse to said longitudinal axis;

a bumper mount integrally formed with at least said end wall from said polymeric material and dimensioned to abuttingly engage an associated jounce bumper, said bumper mount projecting from along said end wall in a first axial direction, said bumper mount including a distal end surface, an outer side surface and an annular groove, said distal end surface disposed in spaced relation in said first axial direction from said end wall, said outer side surface extending between said distal end surface and said end wall of said end member body, and said annular groove extending radially inward into said bumper mount from along said outer side surface; and, a mounting plane disposed in offset relation to said end wall in a second axial direction opposite said first axial direction and along which an associated structural component will abuttingly engage said end member; and, an insert including opposing first and second end surfaces disposed in axially-spaced relation to one another with an outside surface extending therebetween, said insert embedded within at least a portion of said bumper mount and at least a portion of said end wall of said end member body with said outside surface of said insert spaced radially inward of said annular groove of said bumper mount.

19. A gas spring assembly according to claim 18, wherein said first end surface of said insert is disposed toward said distal end wall of said bumper mount and said second end surface of said insert is disposed toward said end wall of said end member body, said insert being positioned within said bumper mount such that said first end surface of said insert is disposed between said distal end surface and said annular groove of said bumper mount.

20. A gas spring assembly according to claim 18, wherein said first end surface of said insert is disposed toward said distal end wall of said bumper mount and said second end surface of said insert is disposed toward said end wall of said end member body, said insert being positioned within said bumper mount such that at least a portion of said annular groove of said bumper mount is disposed between said distal end surface of said bumper mount and said first end surface of said insert.

* * * * *